(12) United States Patent
Vasseur et al.

(10) Patent No.: US 7,945,696 B2
(45) Date of Patent: May 17, 2011

(54) DIFFERENTIATED ROUTING USING TUNNELS IN A COMPUTER NETWORK

(75) Inventors: Jean-Philippe Vasseur, Dunstable, MA (US); Jeff Apcar, Willoughby (AU); Jim Guichard, New Boston, NH (US); Robert H. Thomas, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 155 days.

(21) Appl. No.: 11/947,876

(22) Filed: Nov. 30, 2007

(65) Prior Publication Data

US 2009/0144443 A1    Jun. 4, 2009

(51) Int. Cl.
*G06F 15/173* (2006.01)

(52) U.S. Cl. .................. 709/240; 709/238; 370/351

(58) Field of Classification Search .............. 709/238, 709/240; 370/351
See application file for complete search history.

(56) References Cited

U.S. PATENT DOCUMENTS

| | | |
|---|---|---|
| 6,286,052 B1 | 9/2001 | McCloghrie et al. |
| 6,680,906 B1 | 1/2004 | Nguyen |
| 6,775,231 B1 | 8/2004 | Baker et al. |
| 6,973,315 B1 | 12/2005 | Miernik et al. |
| 6,975,632 B2 | 12/2005 | Deo et al. |
| 7,006,471 B1 | 2/2006 | Iverson et al. |
| 7,149,291 B1 | 12/2006 | Deshpande |
| 7,151,776 B1 | 12/2006 | Iyer et al. |
| 7,180,899 B2 | 2/2007 | De Silva et al. |
| 7,225,271 B1 | 5/2007 | DiBiasio et al. |
| 2005/0060319 A1 | 3/2005 | Douglas et al. |
| 2005/0120102 A1 | 6/2005 | Gandhi et al. |
| 2005/0175014 A1* | 8/2005 | Patrick ................. 370/395.43 |
| 2005/0220131 A1* | 10/2005 | Ginzburg et al. ............ 370/432 |
| 2005/0286559 A1 | 12/2005 | Miernik et al. |
| 2006/0136716 A1* | 6/2006 | Cho et al. ..................... 713/151 |
| 2006/0250964 A1 | 11/2006 | Vasseur et al. |

* cited by examiner

*Primary Examiner* — Philip J Chea
(74) *Attorney, Agent, or Firm* — Cesari and McKenna, LLP

(57) ABSTRACT

In one embodiment, one or more tunnel mesh groups may be established in at least a portion of a computer network, where each tunnel mesh group corresponds to a differentiated routing profile. Traffic may then be received at the portion of the computer network, the traffic indicating a particular differentiated routing profile (e.g., based on a received label corresponding to the differentiated routing profile as advertised by the portion of the computer network). Accordingly, the traffic may be routed through the portion of the computer network along a tunnel of a particular tunnel mesh group corresponding to the particular differentiated routing profile traffic.

27 Claims, 6 Drawing Sheets

DIFFERENTIATED ROUTING USING TUNNELS IN A COMPUTER NETWORK

TECHNICAL FIELD

The present disclosure relates generally to computer networks, and, more particularly, to routing of traffic over tunnels of the computer networks.

BACKGROUND

Traffic sent over computer networks has generally been controlled according to various distinctions in traffic class, type, priority, etc., as will be understood by those skilled in the art. For example, in certain networks, voice traffic may receive better routing treatment (higher precedence, better queuing, etc.) then data traffic. Unfortunately, service providers have generally been unable to differentiate traffic in ways other than the conventional traffic distinctions mentioned above. For instance, it may be beneficial to route traffic on a per-customer and/or per-contract basis, or any other means of traffic differentiation. There remains a need, therefore, for a technique that allows for (efficient) differentiated routing through a computer network.

BRIEF DESCRIPTION OF THE DRAWINGS

Advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

According to embodiments of the disclosure, one or more tunnel mesh groups may be established in at least a portion of a computer network, where each tunnel mesh group corresponds to a differentiated routing profile. Traffic may then be received at the portion of the computer network, the traffic corresponding to a particular differentiated routing profile. Accordingly, the traffic may be routed through the portion of the computer network along a tunnel of a particular tunnel mesh group corresponding to the particular differentiated routing profile traffic.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
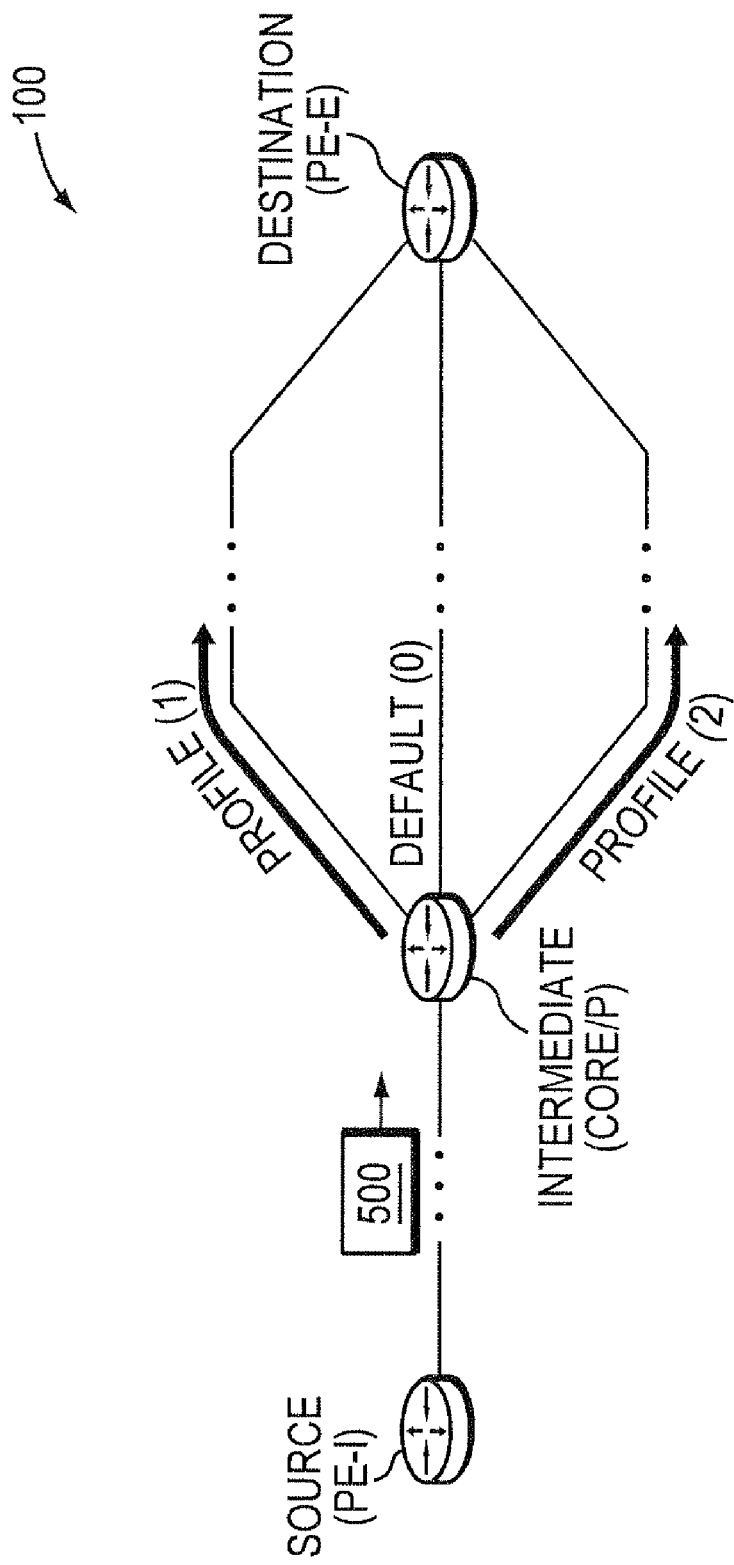
FIG. 1 illustrates an example computer network.

FIG. 1 is a schematic block diagram of an example computer network 100 illustratively comprising nodes/devices making up a portion of a service provider network (e.g., of one or more Virtual Private Networks, or VPNs, as will be understood by those skilled in the art). In particular, the example illustration comprises a source/ingress node "PE-I" (Provider Edge—Ingress) and a destination/egress node "PE-E" (Provider Edge—Egress) interconnected by one or more intermediate/core nodes "C" or "P" (Provider) over links/paths (notably, comprising zero or more core nodes) as shown. In accordance with the embodiments described herein, multiple paths may exist between the core nodes and the destination/egress node, however, as those skilled in the art will appreciate, such paths need not be exclusive, diverse, partially shared, and/or fully shared in any manner. Those skilled in the art will also understand that any number of nodes, devices, links, etc. may be used in the computer network. The view shown herein is merely illustrative and is used for simplicity. Those skilled in the art will further understand that while the embodiments set forth herein are described generally (e.g., in relation to at least a portion of a computer network and/or a service provider network), these embodiments may apply to any network configuration within an Autonomous System (AS) or area, or throughout multiple ASes or areas, etc.

Data packets/traffic 500 may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
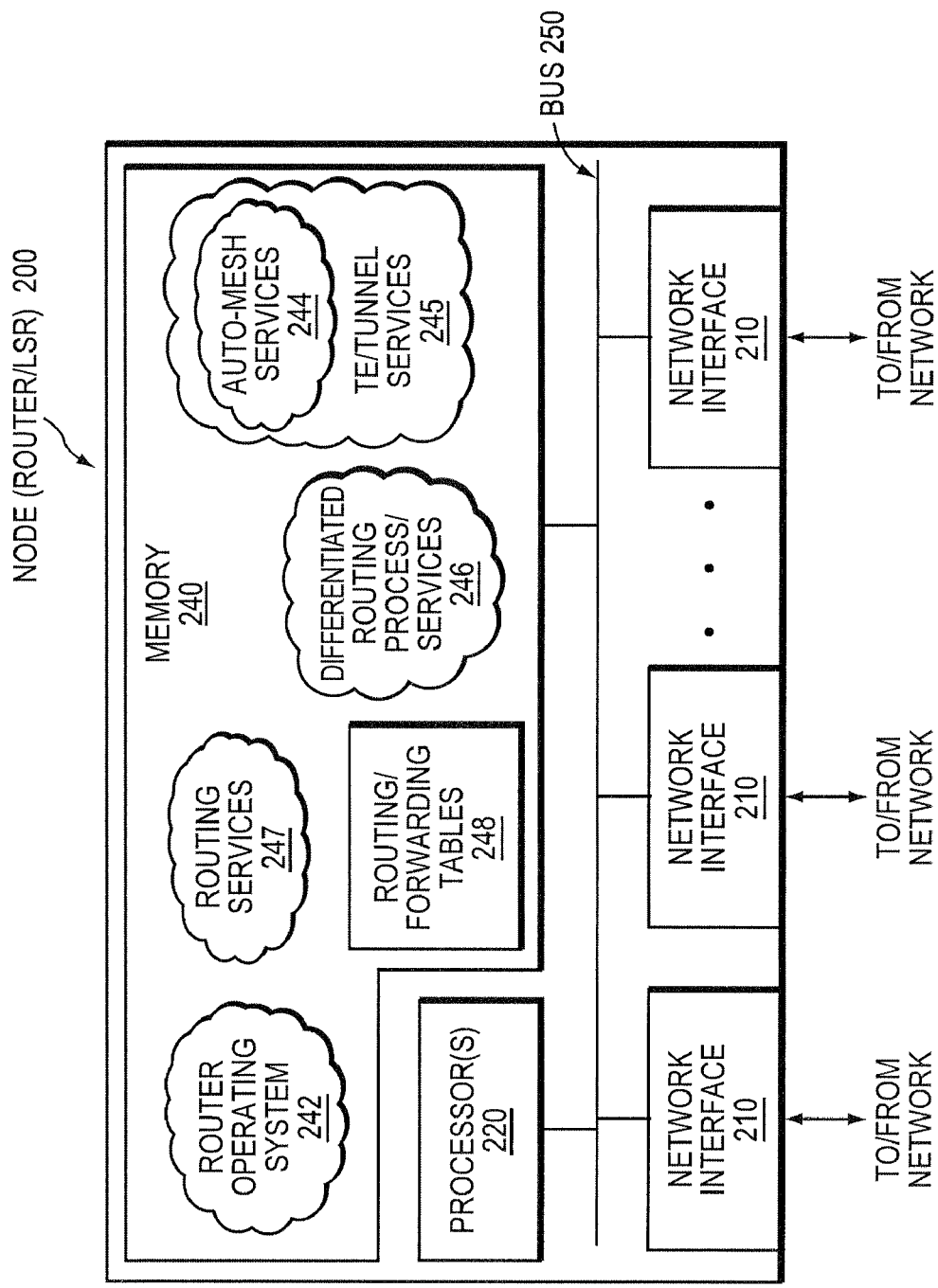
FIG. 2 illustrates an example network device/node.

FIG. 2 is a schematic block diagram of an example node/device 200 that may be advantageously used with one or more embodiments described herein, e.g., as a core/P router. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as routing/forwarding tables 248. A router operating system 242 (e.g., the Internetworking Operating System, or IOS™, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, tunneling process/services 245, auto-mesh process/services 244, and differentiated routing process/services 246. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables 248 containing, e.g., data used to make routing and forwarding decisions. Notably, routing services 247 may also perform functions related to virtual routing protocols, such as maintaining VRF instances (illustratively a component of tables 248) as will be understood by those skilled in the art.

Changes in the network topology within the local domain (network 100) may be communicated among nodes/routers 200 within the network 100 using routing services 247, for example, IGP services such as the conventional OSPF and IS-IS link-state protocols. Suppose, for example, that a communication link fails or a cost value associated with a network node changes. Once the change in the network's state is detected by one of the routers, that router may flood an IGP advertisement/message communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (not shown) stores the FEC, the next-hop information for the LSP, and the label required by the next hop.

Also, MPLS Traffic Engineering (TE) has been developed to meet data networking requirements such as guaranteed available bandwidth or fast reroute/restoration (FRR). MPLS TE exploits modem label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, inter alia, the Layer Two Tunnel Protocol (L2TP), the Point-to-Point Tunneling Protocol (PPTP), and IP tunnels.

Establishment of a tunnel (e.g., TE-LSP) requires computation of a path between a head-end node (LSR) to a tail-end node, signaling along the path (e.g., through RSVP-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. Path computation can either be performed by the head-end node (e.g., in a distributed manner, as described herein) or by some other entity operating as a path computation element (PCE) not co-located on the head-end node. Various path computation methodologies are available including CSPF (constrained shortest path first).

Figure 3:
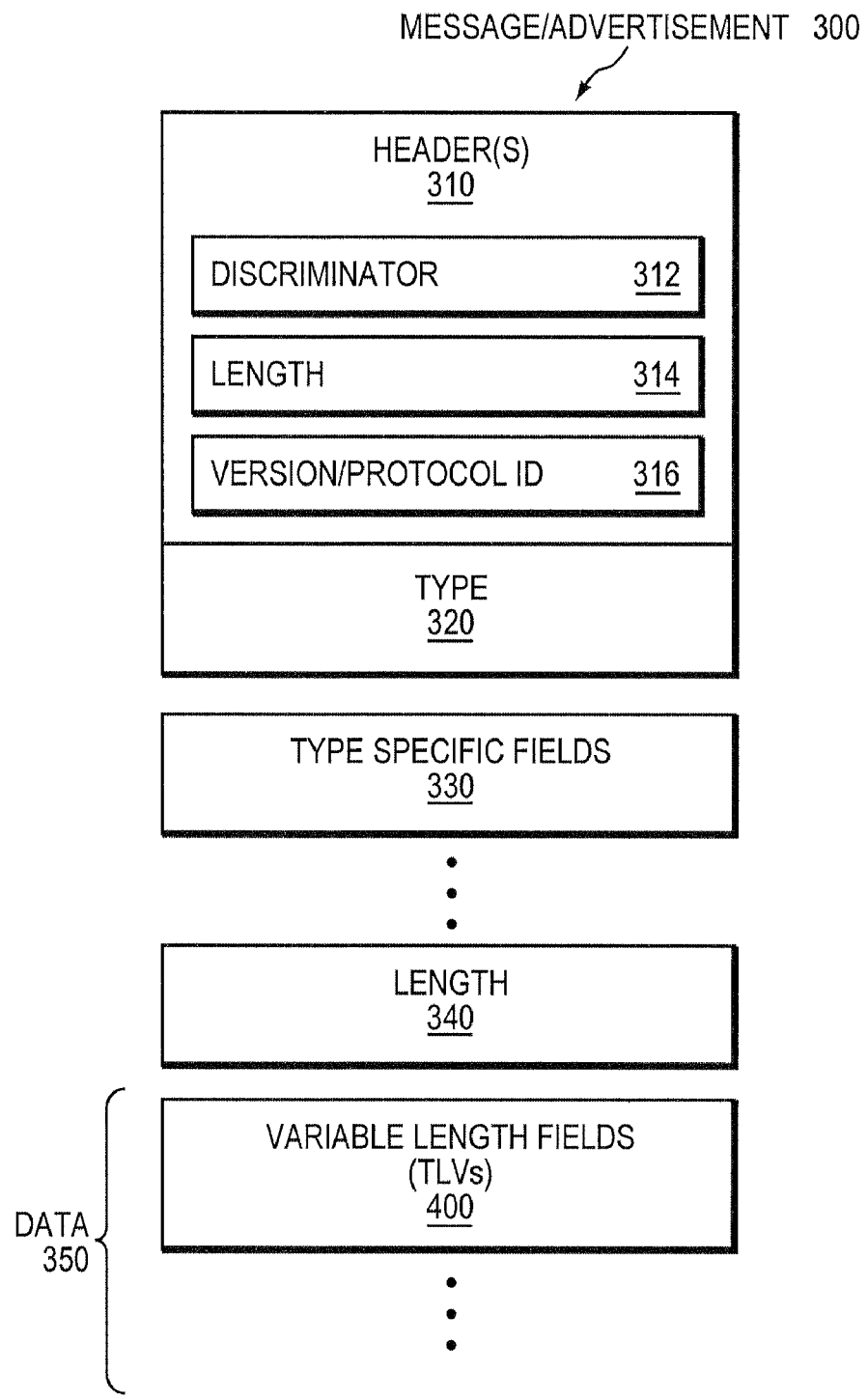
FIG. 3 illustrates an example message/advertisement.

FIG. 3 illustrates an example message/advertisement 300 that may be flooded/sent by the routers 200, such as an IGP advertisement, an LDP message, or other message in accordance with the embodiments described herein. Illustratively, the advertisement/message 300 is shown as a generic packet. Those skilled in the art will understand, however, that particular protocols may have fields not specifically shown that may be used in accordance with the one or more embodiments described herein. The message 300 includes one or more headers 310, having a plurality of fields, one of which is used to identify the message/advertisement, e.g., an intra-domain routing protocol discriminator field 312 that identifies the specific protocol of the message (e.g., IS-IS, OSPF, LDP, etc.), and another of which is a length indicator field 314 that stores a value indicating the length of the standard header for the advertisement/message. Other fields, such as version/protocol ID extension fields 316 may be used to store a value defining the particular version of the protocol.

A type field 320 stores a value indicating the type (and version) of advertisement/message 300 being transmitted, which may define the existence of other type-specific fields 330 within the message. For example, the type of advertisement for an IGP message may be a link state packet, a "Hello" packet, etc., while types for an LDP packet may be a withdraw message, a release message, etc., as will be understood by those skilled in the art. The other type-specific fields 330 may include any number of fields as defined by the protocol, such as source ID fields, checksum fields, maximum area address fields, etc., as understood by those skilled in the art. The length field 340 stores a value indicating the length of the entire message 300, including the header, type-specific fields, and data fields.

The data section 350 includes one or more variable length fields 400, which each have a specific type (or code), length, and value (TLV) as described further herein. For example, to advertise network topology for IGP advertisements, one or more pairs of neighboring-node fields (not shown) and cost fields (not shown) may be used. Alternatively, to advertise labels for LDP messages, one or more label and corresponding node fields may be used (not shown).

In particular, the TLV encoded format is used to identify a type (T) of information being communicated (conveyed), a length (L) of information to be conveyed, and a value (V) of the actual information conveyed (e.g., interpreted based on the type (T) of information). The length (L) parameter contained in the length field is typically implementation-specific and can denote the length from the beginning of the Type field of the object to the end. However, the length generally denotes the length of the Value (V) field and not the Type (T) or Length (L) fields.

Figure 4:
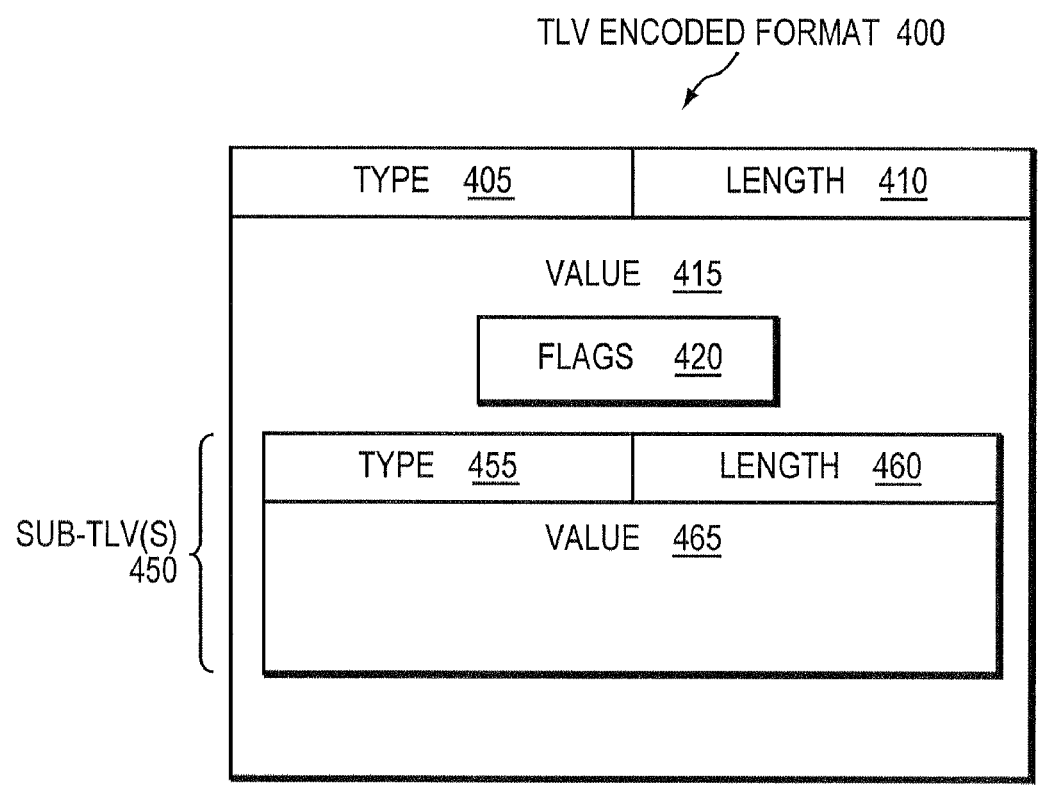
FIG. 4 illustrates an example encoded format (TLV)

FIG. 4 is a schematic block diagram illustrating the TLV encoded format 400 that may be advantageously used with the one or more embodiments described herein. The TLV 400 may be used for a variable length field contained in an IGP advertisement 300, or other protocol messages in accordance with the embodiments described herein. The TLV 400 is organized to include a Type field 405 containing a predetermined type value indicating the type of data contained in the TLV 400, and a Length field 410, which is a variable length value. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420. The fields of the TLV 400 and sub-TLV(s) 450 are used in a variety of manners in messages/advertisements 300 according to the embodiments described herein, including one or more novel manners described herein.

As noted, service providers may benefit from differentiated routing in their network, e.g., on a per-customer/contract basis, such as to provide a wide portfolio of services. For example, certain networks may have long-distance links which are particularly expensive and require careful traffic engineering. In this case, it may be desirable to specify a mechanism that can disable the use of these expensive links to customers that have not subscribed to the long-distance service. Another example relates to the ability to use protected links (with SDH, Optical protection), links with low/high propagation delays, link quality (BER: Bit Error Rate), and so on. Accordingly, a service provider may desire differentiated routing to allow one customer ("x") to subscribe to a service without guarantees on propagation delays, BER, link protection, etc., whereas another customer ("y") may subscribe to a high-end service where its traffic would be routed onto protected links, with low propagation delays, etc.

While certain possible solutions may be utilized, such as multi-topology routing (MTR) or manual administrator configuration, such solutions are cumbersome and/or in-efficient, and are not particularly scalable or flexible. There remains a need, therefore, for a technique that allows for efficient and dynamic differentiated routing through a computer network.

Differentiated Routing

According to embodiments of the disclosure, one or more tunnel mesh groups may be established in at least a portion of a computer network, where each tunnel mesh group corresponds to a differentiated routing profile. Traffic may then be received at the portion of the computer network, the traffic indicating (corresponding to) a particular differentiated routing profile (e.g., based on a received label corresponding to the differentiated routing profile as advertised by the portion of the computer network). Accordingly, the traffic may be routed through the portion of the computer network along a tunnel of a particular tunnel mesh group corresponding to the particular differentiated routing profile traffic.

In an illustrative embodiment, differentiated routing process/services 246 contain computer executable instructions executed by each processor 220 (e.g., of a core/intermediate node) to perform functions relating to the novel techniques described herein to provide for a differential routing mechanism, for instance, in a tunneled computer network (e.g., an MPLS-TE-based Service Provider network 100). In general, differentiated routing services/process 246 comprises instructions directed to perform two main components of the routing mechanism; namely, configuring/distributing the profiles (e.g., LDP extensions) in conjunction with auto-mesh process/services 244 (described herein), and actual routing of the traffic based on those profiles (e.g., an MPLS-TE-based mechanism).

According to one or more embodiments described herein, a service provider may first determine a set of metrics/characteristics of interest for each link of the network that may be used to define differentiated routing profiles. For example, the service provider (or other routing administrator/manager or program) may define links which have failure protection (e.g., specifically by SONET/SDH, Optical protection, FRR, etc. or generally), or links which have particular delay thresholds (e.g., high/low propagation delay links), or links which have particular service provider features (e.g., long-distance links, special service links, etc.), or other metrics/characteristics by which traffic may be differentiated as described herein. Notably, other characteristics that may already have a differentiating factor, such as traffic type/class, may also be considered a metric/characteristic that may be defined by the service provider (network administrator) for particular links (e.g., only voice traffic on certain links, etc.) and used in accordance with the teachings described herein. These metrics/characteristics of links may be manually configured on the routers (core/P routers) of the network, or optionally centrally managed through appropriate infrastructure (e.g., network management services, NMS). (Note also that the metric values may either be static or dynamically computed by the network.)

Once the metrics/characteristics are defined/configured, the core routers/nodes may advertise their links along with the characteristics. For example, the core/P routers may determine the traffic profiles, and may flood an advertisement 300 (e.g., an IGP update message) within the network to the other nodes, e.g., using an affinity link attributes field (type specific field 330) to specify the value of each metric for each link (e.g., values indicating failure protected links, long-distance links, etc.). According to one or more embodiments described herein, receiving these advertisements at the nodes (particularly, at the core/P routers) may activate an "auto-mesh" feature between the nodes, e.g., using auto-mesh process/services 244. In particular, groups of links with the same (or at least compatible) profile characteristics may be combined by the nodes into mesh groups, upon which tunnels may be established. Illustratively, in accordance with known auto-meshing techniques, a core node may flood an IGP update message 300 comprising a TE-MESH-GROUP TLV 400 that carries a novel TRAFF-CHAR sub-TLV 450. The semantics of this advertisement is for the node (core/P router) to request joining a "tunnel mesh group" of all the core/P routers that forwards traffic with the same characteristics.

Once the core/P routers (i.e., auto-mesh processes 244) have determined the other members of the tunnel mesh groups used to carry traffic of the same profiles, the routers may compute a set of tunnels satisfying the affinity constraints (i.e., using links sharing the profile characteristics) so as to join the tunnel mesh group. The routers may then establish one or more tunnel mesh groups in the computer network 100, where each tunnel mesh group corresponds to a differentiated routing profile. In other words, auto-mesh process 244 may be configured to create tunnel mesh groups as an auto-mesh (i.e., an automatically created mesh) of tunnels between each node of a configured subset of the network 100 as will be understood by those skilled in the art, such as illustratively between each of the core/P routers, particularly between each core/P router adjacent to a PE router.

Illustratively, tunnel mesh groups may be established between core/P routers in order to create a mesh between those core/P routers. For instance, as will be understood by those skilled in the art, the scalability of creating a mesh between PE routers may be too great a burden. Accordingly, the mesh may be created between core/P routers, and the PE routers simply forward (e.g., label switch over LSPs) the traffic to the appropriate core/P router to enter the mesh.

Upon each head-end node of a profile tunnel (e.g., each core/P router) establishing its tunnels, each node advertises multiple labels; one for its conventionally routed (default) path, and one for each of the defined profiles and corresponding tunnels (e.g., profile 1 and profile 2 as in FIG. 1). As each node (including a head-end node) of the network 100 receives these labels from the head-end nodes, the node generates and advertises its own labels corresponding to the profiles, that is, labels for the traffic prior to entering the tunnels. In other words, routers (e.g., core/P) that are head-end nodes advertise labels for their supported profile tunnels, and their neighbors receive and advertise labels to their peers for profile labels (pre-tunnel labels), thus eventually received at the PEs (e.g., PE-I) for LSPs to each core/P head-end node of a profile tunnel.

In this manner, nodes/routers that are not part of a particular tunnel mesh group may be aware of the profiles and the routes/paths to reach the head-end nodes of a corresponding profile tunnel. For example, the PE routers (e.g., PE-I) that use profiles may learn the labels for the profiles for each egress PE to which it sends traffic (e.g., PE-E), and there is a path (LSP) for each profile of interest from the ingress PE to the core/P router that is both on the routed path to the egress PE and is a head-end node for the profile tunnels.

In particular, per-profile labels may be advertised in Label Mapping messages by exploiting extension mechanisms (TLVs 400) in LDP messages 300. The Label Mapping message 300 that carries the label for PE-E's routed path may also carry the profile labels for PE-E in an optional (new) Profile Labels TLV 400 (or sub-TLV 450, accordingly). For instance, the Profile Labels TLV 400 which may be an optional parameter in Label Mapping, Label Withdraw, and Label Release messages 300 (as will be understood by those skilled in the art) may comprise, along with identifying type, length, and flag fields (405, 410, and 420, respectively), an array of profile-ID/label pairs, where the profile-ID serves to identify the profile (i.e., the profile rules) for the associated label (e.g., "prof_n" or "profile 1", etc.). In accordance with LDP as modified by one or more embodiments described herein, nodes may withdraw all of the profile labels in a withdraw message (e.g., and advertise a new message with only those profile labels that remain), or may send out LDP messages withdrawing only a sub-set of the profile labels.

Notably, once the tunnel mesh groups are established with corresponding labels, the forwarding tables (VRFS) 248 of the router/nodes in the network may be updated so as to route the appropriate traffic onto the corresponding set of tunnels (or LSPs toward the tunnels). In other words, differentiated routing may be performed by making an auto-route feature (routing process 247) in each node aware of the traffic profiles so as to route the traffic toward the set of tunnels (from PE routers onto LSPs) or onto the set of tunnels (from core/P routers) that satisfy the traffic requirement (i.e., that meet/match the profile).

With the tunnel mesh groups established, the appropriate labels distributed, and the forwarding tables updated, the nodes/routers of the network 100 may receive traffic indicating (corresponding to) a particular differentiated routing profile, and may perform differentiated routing accordingly. In particular, traffic may be sent/received with an indication of the particular differentiated routing profile (e.g., as a label, as mentioned above). Alternatively, traffic may be sent/received with certain traffic characteristics that may be used to place the traffic with a particular differentiated routing profile (e.g., voice labels, priority levels, etc., that conform to a particular profile, if so configured, to allow such placement by the service provider/network administrator). The receiving nodes may then route the traffic through the computer network toward and along a tunnel of a particular tunnel mesh group corresponding to the particular differentiated routing profile of the traffic. (In other words, illustratively, the PE routers determine the appropriate profile for traffic and label the traffic accordingly. However, according to one or more alternate embodiments, the head-end nodes of the tunnels may determine the appropriate profile for traffic themselves according to the label.)

Figure 5A:
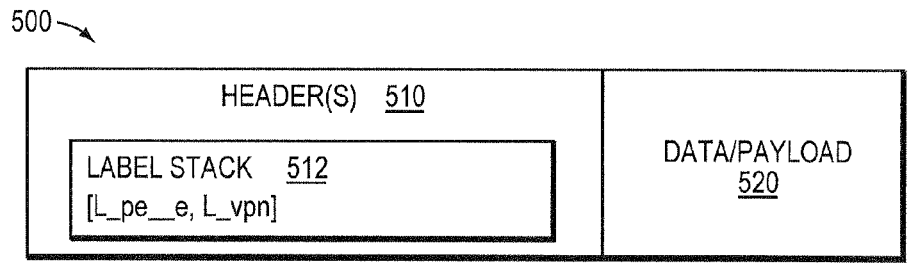
FIGS. 5A-D illustrate example packets/traffic.

More specifically, FIGS. 5A-D illustrate example packets/traffic 500 in accordance with one or more embodiments described herein. In particular, the traffic 500 may comprise one or more headers 510 (with label stack(s) 512) and a data/payload field 520, as will generally be understood by those skilled in the art. Conventionally, as shown in FIG. 5A, when packets from PE-I to PE-E follow the normally routed path (e.g., the default path), the label stack 512 received at the core/P routers is (illustratively) "[L_pe_e, L_vpn]", where L_pe_e is the label for PE-E, and L_vpn is the label for the VPN prefix (e.g., in the instance where VPNs are used and learned via BGP, as will be understood). In this conventional situation, there is no differential routing, and the traffic 500 traverses the default path as computed by each node of the network 100.

Figure 5B:
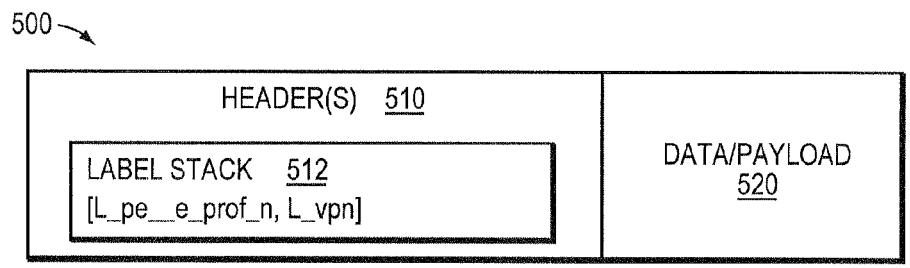
Figure 5C:
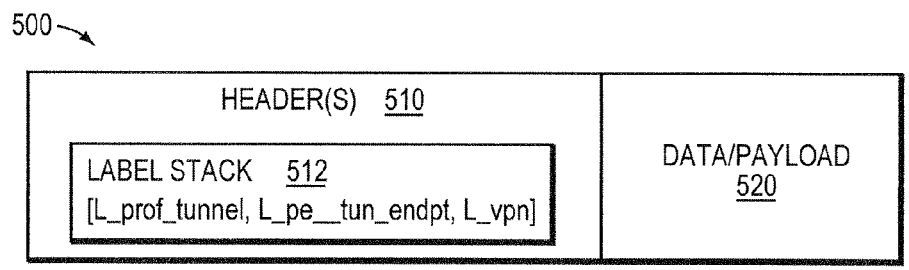
Figure 5D:
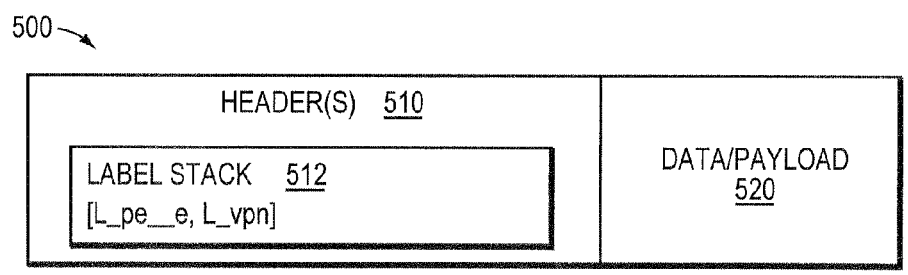

Having established the tunnels within the network 100 (e.g., meshed between core/P routers) in accordance with the techniques described herein, however, the traffic 500 may follow differentiated routing paths/tunnels accordingly. For example, FIGS. 5B-D illustrate a progression of a label stack 512 as traffic flows from source PE-I to destination PE-E through the differentiated routing network 100 according to established profile tunnels. For instance, in FIG. 5B, the traffic 500 begins on the links between PE-I and the first core router that is an appropriate head end of the profile tunnels (that is, the traffic is not yet on a differentiated routing tunnel). As such, the label stack 512 of the traffic 500 may illustratively be "[L_pe_e_prof_n, L_vpn]", where L_pe_e_prof_n is the label that identifies both the destination (egress PE-E) and the packet's profile ("prof_n"), e.g., as learned via LDP messages 300 described above. Again, L_vpn is the VPN prefix.

Once the head-end core router receives the traffic 500 and places it on a corresponding differentiated routing profile tunnel, as shown in FIG. 5C, the label stack 512 becomes, e.g., "[L_prof_tunnel, L_pe_e_tun_endpt, L_vpn]" for the links along the tunnel. Here, L_prof_tunnel is the label for the profile tunnel (e.g., as learned via RSVP-TE) that corresponds to the traffic profile (e.g., prof_n). Also, L_pe_e_tun_endpt is the label for PE-E (the destination) as advertised by the tunnel tail end (e.g., another core/P router, not shown, prior to PE-E). For example, this label may be learned through LDP via a targeted LDP session between the profile tunnel head-end and tail-end, as will be understood by those skilled in the art. L vpn remains the VPN label.

Next, once the traffic 500 exits the corresponding profile tunnel, the tunnel labels are dropped, and as shown in FIG. 5D, replaced from the tail-end of the tunnel to the destination PE-E by "[L_pe_e, L_vpn]". In this case, L_pe_e is the label for PE-E as learned from the routed next-hop for PE-E (e.g., via LDP), and L_vpn is the VPN prefix. In other words, once the traffic 500 leaves the differentiated routing tunnel, it may be routed (label switched) to the destination PE-E according to conventional techniques.

Notably, in the event that a receiving router determines that the traffic does not correspond to a particular differentiated routing profile, that is, that the traffic has no indication (label) for a particular profile nor can the traffic be placed into a particular profile, the router may route the traffic according to a default routing profile. For example, each router generally has a default route to each other router/node in the network, the default route being established without consideration of differentiated routing as described herein. Accordingly, if differentiated routing cannot be applied to the traffic, then the default route (e.g., default (0), may be used by the router.

Figure 6:
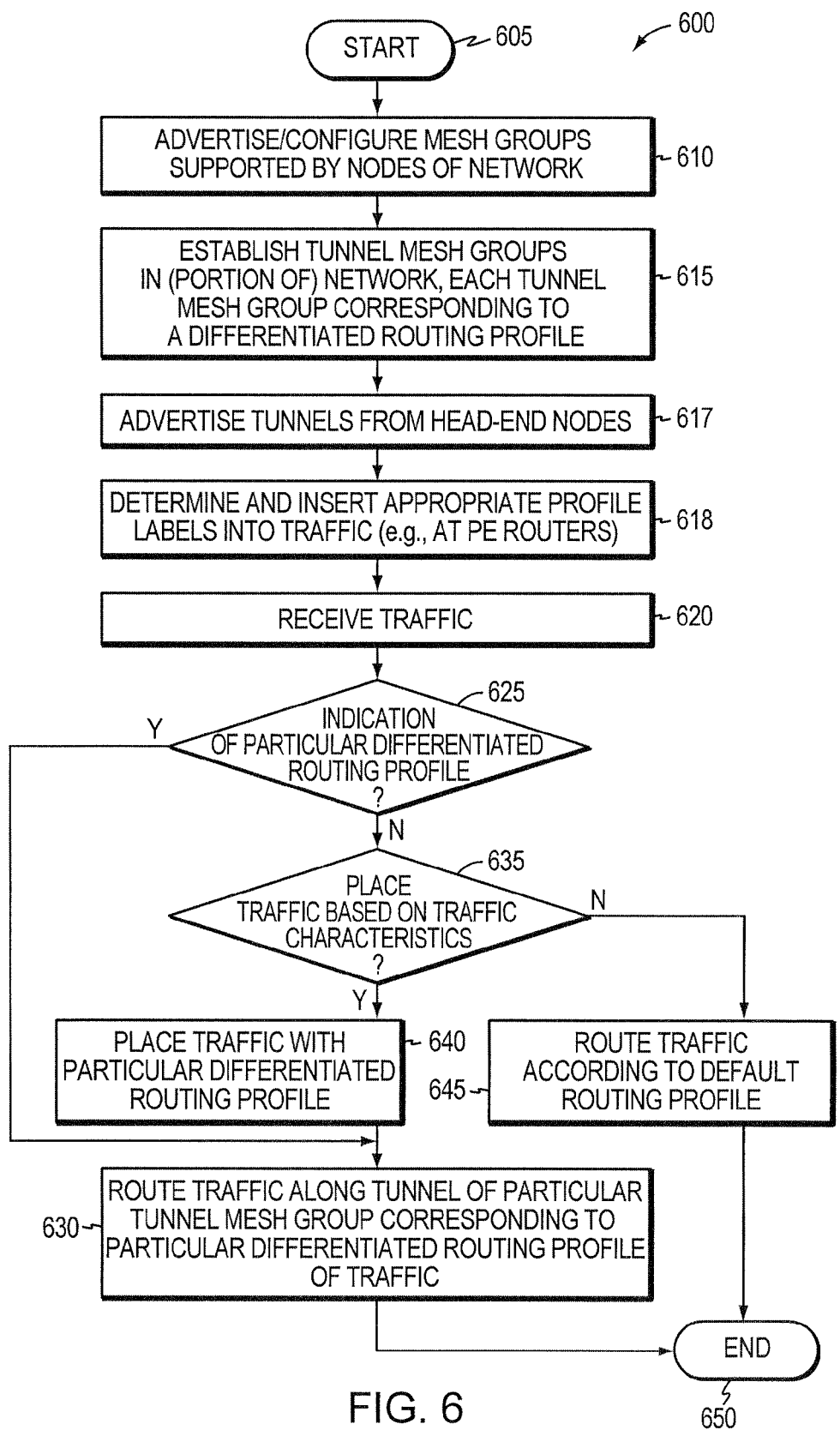
FIG. 6 illustrates an example procedure for differentiated routing.

FIG. 6 illustrates an example procedure for differentiated routing in accordance with one or more embodiments described herein. The procedure 600 starts at step 605, and continues to step 610, where nodes of the network (e.g., core/P nodes/routers) are configured with and/or advertise supported mesh groups, such as according to routing characteristics (e.g., selected by the service provider) as mentioned above. Once the nodes (core nodes) of the network are aware of supported mesh groups, the nodes may establish tunnel mesh groups in (a portion of) the network in step 615, such as through an auto-mesh function, where each tunnel mesh group corresponds to a differentiated routing profile, as described above. The tunnels themselves may then be advertised in step 617, e.g., from core/P head-end nodes to PE routers, such that PE routers may determine and insert appropriate profile labels into the traffic accordingly in step 618 (i.e., to forward the traffic along particular LSPs toward the appropriate profile tunnels).

Upon receiving traffic in step 620, a profile tunnel head-end node determines whether there is an indication of a particular differentiated routing profile in step 625, such as a profile label. If so, the node routes the traffic in step 630 along a tunnel of a particular tunnel mesh group corresponding to particular differentiated routing profile of traffic. For example, as mentioned above, if a profile label for a particular egress node (e.g., "L_pe_e_prof_n") is received, then the node routes/forwards the traffic accordingly (e.g., to PE-E, under profile "prof_n" rules). If no indication of profile is found within the traffic in step 625, the nodes may determine whether they can place the traffic into a profile based on certain traffic characteristics in step 635, and if so (e.g., according to an alternate embodiment), may place the traffic with a particular differentiated routing profile in step 640, and return to step 630 to route the traffic along a tunnel of particular tunnel mesh group corresponding to the particular (placed) differentiated routing profile of traffic. In the event that there is no indication of a profile, no means by which to place the traffic into a profile, or an indication of a profile that is not supported/known by the receiving node, the node may route the traffic according to a default routing profile in step 645. The procedure 600 ends in step 650, and may thereafter return to any appropriate step above, e.g., 610 to configure/update the profiles/groups/tunnels, 620 to receive additional traffic, etc.

Notably, the teachings in accordance with the embodiments described herein may be extended to other suitable situations. For example, differentiated routing may be used to enforce a maximum amount of traffic that could be routed on certain links. For example, long-distance traffic may cost $X per MBits/s, while local traffic may cost $Y per MBits/s (generally, where Y<X). Using a tariff service such as this, customer (x) may pay for 25M of long-distance traffic and 100M of local traffic, while customer (y) may pay for 60M of long-distance traffic and 150M of local traffic. Other extensions may also be applied for differentiated routing as determined by service providers (network administrators), such as to apply in-contract rates when traffic meets certain profiles, and out-of-contract rates when traffic does not meet with those profiles (or meets other profiles). The example metrics/characteristics used to define profiles and the uses of the profiles for differentiated routing as described herein are merely illustrative, and are not meant to be limiting to the scope of the embodiments described herein.

Advantageously, the novel techniques described herein provide for differentiated routing in a computer network. By establishing one or more mesh groups based on routing profiles, the novel techniques allow for traffic to be handled in a differentiated manner. In particular, the techniques described above provide for a scalable and flexible solution, while the dynamic aspects of one or more embodiments described herein alleviate the need for cumbersome and inefficient manual configuration. Also, by establishing tunnel mesh groups between core/P routers and advertising profile tunnel labels to PE routers (e.g., in one embodiment), the novel techniques provide for scalable differentiated routing between PE routers of a provider network, and alleviate the need for core/P routers to place traffic into a particular profile (that is, other than the advertised label), accordingly.

While there have been shown and described illustrative embodiments that provide for differentiated routing in a computer network, it is to be understood that various other adaptations and modifications may be made within the spirit and scope of the present invention. For example, the embodiments have been shown and described herein with reference to particular tunneling protocols (e.g., MPLS) and messages. However, the embodiments of the invention in their broader sense are not so limited, and may, in fact, be used with any suitable protocols and messages, for example, capable of supporting certain traffic engineering functionality beneficial to the techniques described herein. Also, while the above description references service provider networks and VPNs, other networks and network domains may advantageously utilize the techniques of one or more embodiments described herein, accordingly. Moreover, while the auto-mesh of tunnels illustratively establish a mesh of tunnels between core/P routers adjacent to PE routers, any configurable subset or portion of the network 100 may be configured to establish the mesh of tunnel, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
    grouping at least some links in a computer network into one or more groups based on the one or more characteristics of the links, wherein each link in a same group has same or compatible characteristics as other links in that group;
    utilizing an auto-mesh process to establish one or more tunnels upon each of the groups to create tunnel mesh groups in at least a portion of the computer network, each tunnel mesh group including a mesh of tunnels between nodes of the portion of the computer network extending over links of the respective group, each tunnel mesh group corresponding to a differentiated routing profile, each tunnel of a respective tunnel mesh group associated with a profile label for the corresponding differentiated routing profile;
    receiving traffic at the portion of the computer network, the traffic indicating a particular differentiated routing profile; and
    routing the traffic through the portion of the computer network along a tunnel of a particular tunnel mesh group corresponding to the particular differentiated routing profile traffic by associating the traffic with a particular profile label.

2. The method as in claim 1, further comprising:
    advertising, from nodes of the computer network, a set of one or more differentiated routing profiles that the nodes support.

3. The method as in claim 1, further comprising:
    advertising the profile labels for differentiated routing profiles.

4. The method as in claim 1, further comprising:
    receiving the traffic at the portion of the computer network with an indication of the particular differentiated routing profile; and
    placing the traffic onto a corresponding tunnel based on the indication.

5. The method as in claim 1, wherein the portion of the computer network is a service provider (SP) network.

6. The method as in claim 5, wherein the portion of the computer network comprises core routers of the SP network.

7. The method as in claim 1, wherein the portion of the computer network is a particular virtual private network (VPN).

8. The method as in claim 1, further comprising:
    determining that the traffic does not correspond to a particular differentiated routing profile; and
    routing the traffic according to a default routing profile.

9. The method as in claim 1, wherein the one or more characteristics are selected from the group consisting of: failure protection; delay thresholds; service provider features; and traffic type.

10. An apparatus, comprising:
    one or more network interfaces;
    one or more processors coupled to the network interfaces and adapted to execute one or more processes; and
    a memory adapted to store a differentiated routing process executable by each processor, the differentiated routing process when executed operable to: i) determine at least some links in a computer network are grouped into one or more groups based on the one or more characteristics of the links, wherein each link in a same group has same or compatible characteristics as other links in that group, ii) cause establishment of one or more tunnel mesh groups in at least a portion of the computer network, each tunnel mesh group including an automatically-created mesh of tunnels between nodes of the portion of the computer network extending over links of the respective group, each tunnel mesh group corresponding to a differentiated routing profile, each tunnel of a respective tunnel mesh group associated with a profile label for the corresponding differentiated routing profile iii) receive traffic, the traffic indicating a particular differentiated routing profile, and iv) route the traffic through the portion of the computer network along a tunnel of a particular tunnel mesh group corresponding to the particular differentiated routing profile traffic by associating the traffic with a particular profile label.

11. The apparatus as in claim 10, wherein the differentiated routing process when executed is further operable to:
    advertise a set of one or more differentiated routing profiles that the node supports; and
    receive advertisements for a set of one or more differentiated routing profiles that one or more other nodes support.

12. The apparatus as in claim 11, wherein the memory is further adapted to store an auto-mesh process executable by each processor, the auto-mesh process when executed operable to:
    create the tunnel mesh groups through an auto-mesh of tunnels between the nodes on links that share differentiated routing profiles.

13. The apparatus as in claim 10, wherein the differentiated routing process when executed is further operable to:
    advertise the profile labels for differentiated routing profiles.

14. The apparatus as in claim 10, wherein the differentiated routing process when executed is further operable to:
    receive the traffic with an indication of the particular differentiated routing profile; and
    place the traffic onto a corresponding tunnel.

15. The apparatus as in claim 10, wherein the portion of the computer network is a service provider (SP) network.

16. The apparatus as in claim 15, wherein the node comprises a core router of the SP network.

17. The apparatus as in claim 10, wherein the portion of the computer network is a particular virtual private network (VPN).

18. The apparatus as in claim 10, wherein the differentiated routing process when executed is further operable to:
determine that the traffic does not correspond to a particular differentiated routing profile; and
route the traffic according to a default routing profile.

19. An apparatus, comprising:
means for determining at least some links in a computer network are grouped into one or more groups based on the one or more characteristics of the links, wherein each link in a same group has same or compatible characteristics as other links in that group;
means for establishing tunnels upon each of the groups to create one or more tunnel mesh groups in at least a portion of the computer network, each tunnel mesh group including an automatically-created mesh of tunnels between nodes of the portion of the computer network extending over links of the respective group, each tunnel mesh group corresponding to a differentiated routing profile, each tunnel of a respective tunnel mesh group associated with a profile label for the corresponding differentiated routing profile;
means for receiving traffic at the portion of the computer network, the traffic indicating a particular differentiated routing profile; and
means for routing the traffic through the portion of the computer network along a tunnel of a particular tunnel mesh group corresponding to the particular differentiated routing profile traffic, by associating the traffic with a particular profile label.

20. A method, comprising:
grouping at least some links that interconnect a plurality of nodes in a computer network into one or more groups based on one or more characteristics of the links, wherein each link in a same group has same or compatible characteristics as other links in that group;
activating an auto-mesh process to automatically create a mesh of tunnels over the links of each of the one or more groups, to establish one or more tunnel mesh groups that couple the nodes interconnected by the links of the respective group, each tunnel mesh group corresponding to a differentiated routing profile, each tunnel of a respective tunnel mesh group associated with a profile label for the corresponding differentiated routing profile;
receiving traffic at a node;
determining that the traffic is associated with a particular differentiated routing profile; and
in response to the traffic being associated with the particular differentiated routing profile, routing the traffic along a tunnel of a particular tunnel mesh group corresponding to the particular differentiated routing profile by associating the traffic with a particular profile label.

21. The method as in claim 20, further comprising:
receiving second traffic at the node;
determining that the second traffic is not associated with any differentiated routing profile; and
in response to the second traffic not being associated with any differentiated routing profile, routing the second traffic according to a default routing profile.

22. The method as in claim 20, further comprising:
advertising a set of one or more differentiated routing profiles that the node supports.

23. The method as in claim 20, wherein the plurality of nodes comprise core routers of a service provider (SP) network.

24. An apparatus, comprising:
one or more network interfaces;
one or more processors coupled to the network interfaces and configured to execute one or more processes; and
a memory configured to store a differentiated routing process and an auto-mesh process executable by at least one of the one or more processors, the differentiated routing process when executed operable to:
determine that at least some links in a computer network are grouped into one or more groups based on one or more characteristics of the links, wherein each link in a same group has same or compatible characteristics as other links in that group,
determine that received traffic is associated with a particular differentiated routing profile, and
in response to the traffic being associated with the particular differentiated routing profile, cause the received traffic to be routed along a tunnel of a particular tunnel mesh group corresponding to the particular differentiated routing profile by associating the traffic with a particular profile label, and
the auto-mesh process when executed operable to:
automatically create a mesh of tunnels over the links of each of the one or more groups, to establish a plurality of tunnel mesh groups that couple nodes interconnected by the links of the respective group, each tunnel mesh group corresponding to a differentiated routing profile, each tunnel of a respective tunnel mesh group associated with a profile label for the corresponding differentiated routing profile.

25. The apparatus as in claim 24, wherein the differentiated routing process when executed is further operable to:
determine second traffic is not associated with any differentiated routing profile, and
in response to the second traffic not being associated with any differentiated routing profile, cause the second traffic to be routed according to a default routing profile.

26. The apparatus as in claim 24, wherein the differentiated routing process when executed is further operable to:
advertise a set of one or more differentiated routing profiles that the apparatus supports.

27. The apparatus as in claim 24, wherein the apparatus is a core router of a service provider (SP) network.

* * * * *

UNITED STATES PATENT AND TRADEMARK OFFICE
CERTIFICATE OF CORRECTION

PATENT NO. : 7,945,696 B2  
APPLICATION NO. : 11/947876  
DATED : May 17, 2011  
INVENTOR(S) : Vasseur et al.

Page 1 of 1

It is certified that error appears in the above-identified patent and that said Letters Patent is hereby corrected as shown below:

Col. 4, Line 17 should read: "TE exploits ~~modem~~ modern label switching techniques to build end-"

Col. 8, Line 16 should read: "corresponding labels, the forwarding tables ~~(VRFS)~~ (VRFs) 248 of"

Signed and Sealed this
Twenty-second Day of May, 2012

David J. Kappos
*Director of the United States Patent and Trademark Office*